(No Model.) 2 Sheets—Sheet 1.

R. S. OLIVER.
COMBINED COTTON CHOPPER AND CULTIVATOR.

No. 349,403. Patented Sept. 21, 1886.

Witnesses
R. C. Laurie
Sarepta Specht.

Inventor;
Richard S. Oliver
By R. S. & A. P. Lacey
Att'ys (No Model.) 2 Sheets—Sheet 2.
R. S. OLIVER.
COMBINED COTTON CHOPPER AND CULTIVATOR.
No. 349,403. Patented Sept. 21, 1886.

Witnesses:
R. C. Laurie
Sarepta Specht

Inventor
Richard S. Oliver
By R. S. & A. P. Lacey
Attys.

N. PETERS, Photo-Lithographer, Washington, D. C.

UNITED STATES PATENT OFFICE.

RICHARD S. OLIVER, OF RUSSELLVILLE, ALABAMA.

COMBINED COTTON CHOPPER AND CULTIVATOR.

SPECIFICATION forming part of Letters Patent No. 349,403, dated September 21, 1886.

Application filed June 26, 1886. Serial No. 206,349. (No model.)

*To all whom it may concern:*

Be it known that I, RICHARD S. OLIVER, a citizen of the United States, residing at Russellville, in the county of Franklin and State of Alabama, have invented a certain new and useful Improvements in a Combined Cotton Chopper and Cultivator; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in the improved construction, arrangement, and combination of parts of a combined cotton chopper and cultivator, which will be hereinafter fully described and claimed.

Figure 1:
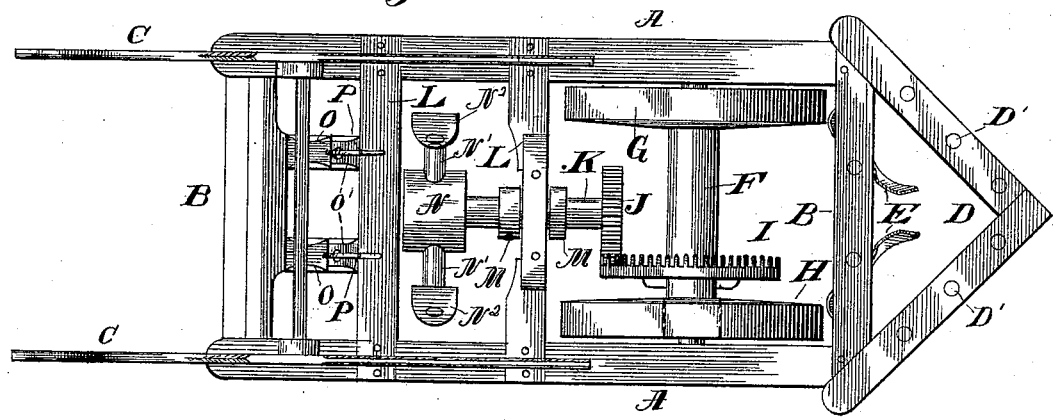
Figure 2:
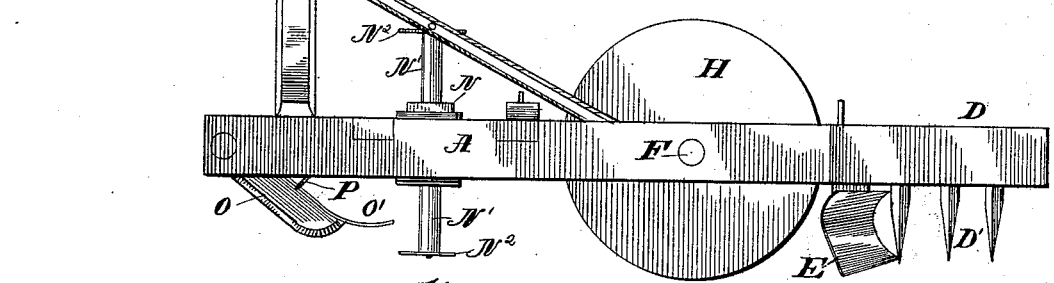
Figure 3:
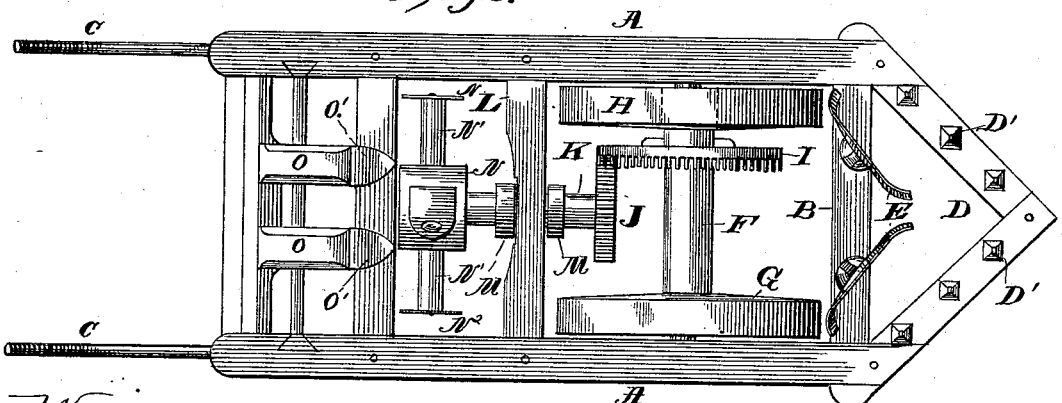
Figure 4:
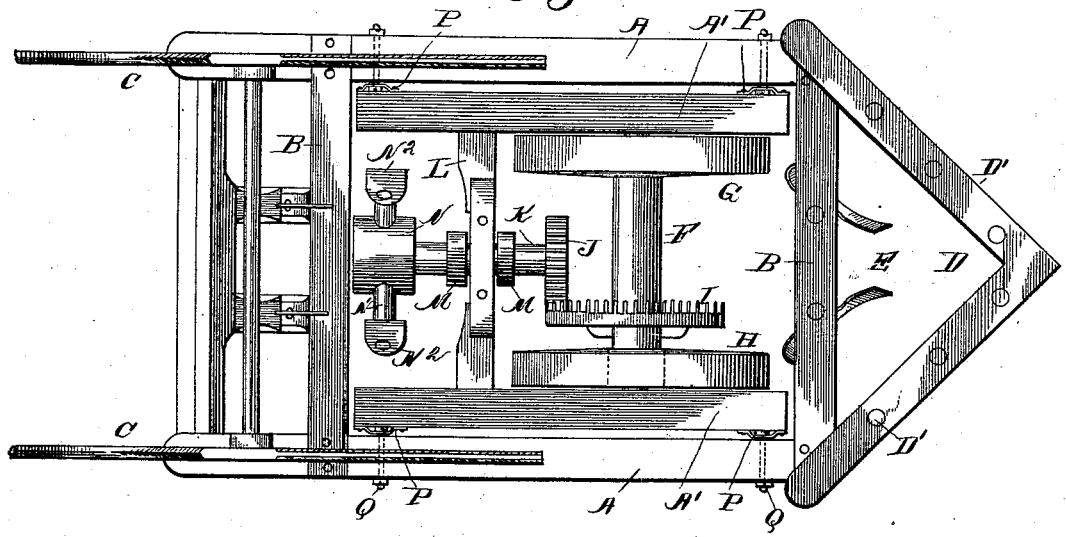
Figure 5:
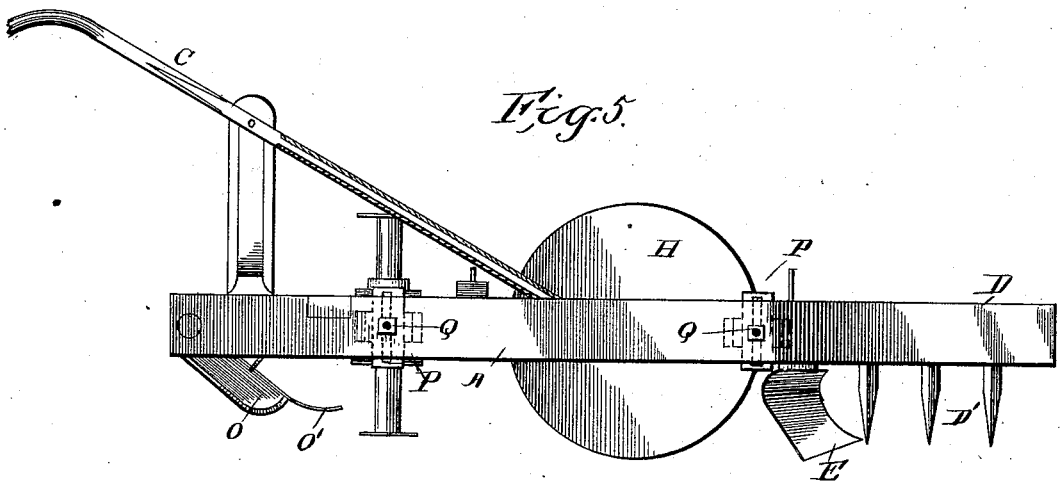
Figure 6:
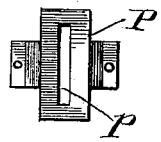

Referring to the accompanying drawings, Figure 1 is a top plan view of my improved cotton chopper and cultivator. Fig. 2 is a side elevation of the same, and Fig. 3 is a bottom plan view, and Fig. 4 is a plan view of a modified form. Fig. 5 is a side view of the same, and Fig. 6 is a detail view of the plate, whereby the frame supporting the chopper and its operating mechanism may be adjusted.

Referring to the several parts by letters, A A indicate the side pieces, and B B the end pieces, of the rectangular frame of my machine, the said frame being preferably two feet wide by five feet long. This frame is provided at its rear portion with the handles C, of ordinary construction. To the front of the main frame is secured the V-shaped harrow-frame D, having the harrow-teeth D', of the usual construction.

E E represent the scrapers, which are supported by their standards in the front end of the main frame to the rear of the harrow D, and at a suitable distance to the rear of this end piece is journaled in the side pieces of the main frame the axle F, on which the drive-wheels G and H are mounted. One of these wheels, G, is tightly keyed upon the axle, so as to revolve the axle with it as it runs along the ground, while the outer wheel, H, is loosely mounted upon the axle, and turns without affecting the axle. The object of this arrangement will hereinafter be described.

On the axle F, near the center thereof, is tightly keyed the gear-wheel I, which meshes with the teeth of a pinion, J, rigidly secured on the forward end of a longitudinal shaft, K, which is journaled in cross-pieces L L in the main frame, this shaft being provided with the collars M, which prevent it from slipping backward or forward in its bearings, and upon that portion of the shaft K between the cross-pieces L L is mounted the chopper, consisting of the revolving head N, having the radial arms N', which carry at their outer ends the chopping-blades $N^2$, the shaft K being journaled exactly in the center of the width of the main frame, as shown. In the rear end piece of the main frame are secured the upper ends of the standards O of the two plows O', the said standards being braced by the brace-rods P, extending to the rear cross-piece, L.

In operation, when it is desired to throw the chopper out of operation while cultivating the row of plants, it is only necessary to incline the frame slightly by means of the handles, so as to raise the tightly-keyed wheel G out of contact with the ground, so that the loose wheel H alone will run upon the ground, and as long as the machine is held in this position the chopper-shaft will remain stationary, as will be readily seen, while by lowering the tightly-keyed wheel G into contact with the ground the axle F will be rotated, and thus, through the gear-wheel I and the pinion J, will revolve the chopper-shaft K, and thus operate the chopper. The space between the two middle teeth of the harrow and the scrapers E E and the rear plows is in each case of sufficient width to cause these several parts to pass on each side of a row without disturbing the plants, while the chopper thins out the plants at regular intervals.

From the foregoing description, taken in connection with the accompanying drawings, the construction and operation of my invention will be readily understood.

It will be seen that my improved cotton chopper and cultivator is strong and simple in construction and very efficient and convenient in its operation, as it may be employed as a cultivator alone, or as both a cultivator and chopper by a simple movement of the handles of the main frame while in operation.

In some instances it has been found expedient to adjust the axle F and shaft N independently of the main frame, so as to adjust the chopper vertically relative to the harrow, plows, and scrapers. For this purpose the side bars A of the main frame are provided with a supplemental frame consisting of side bars A', located on the inner sides and united by the cross-piece L, which supports the axle F and shaft K, with their attachments, in a manner similar to the main frame. Plates P, secured to the ends of the bars A' on the sides adjacent the bars A, are vertically slotted. Through the slots $p$ are projected bolts Q, which extend through the bars A. The heads of the bolts engage the inner side of the plates on each side of the slots. The slotted portion is raised from the face of the bars A' sufficiently far to permit a free movement of the head of the bolt between the plates and the bars. By this construction one end of the supplemental frame may be adjusted either in the front or rear for regulating the pitch of the chopper, or both ends may be adjusted, thus raising or lowering said supplemental frame and preserving it parallel with any given plane.

Having thus described my invention, what I claim, and desire to secure by Letters Patent of the United States, is—

1. The combination, with the rectangular frame having suitable handles, of the triangular harrow secured to its forward end, having the base forming the front end piece of the frame, the scrapers secured to said end piece, a transverse axle having a loose wheel at one end and a tightly-keyed wheel at the opposite end, and having the gear-wheel mounted upon it, the shaft journaled within the frame and having at its forward end the pinion, and carrying the chopper-blades, and the rear plows arranged as described and secured to the rear end piece, substantially as set forth.

2. The combination, with the rectangular frame having suitable handles, the triangular harrow secured to its forward end, having the base forming the front end piece, the scrapers secured to the said end piece, and the plows secured to the rear end piece, as shown, of the supplemental frame secured to and adjusted vertical independently of the main frame, the axle mounted in said supplemental frame, having suitable drive-wheels and provided with the gear-wheel, the shaft journaled within the supplemental frame, having the pinion at its front end meshing with the gear-wheel and carrying the chopper-blades at its rear end, substantially as and for the purposes described.

In testimony whereof I affix my signature in presence of two witnesses.

RICHARD S. OLIVER.

Witnesses:
E. D. C. HILL,
W. M. HURST.